United States Patent
Figlioli et al.

(10) Patent No.: US 9,586,610 B2
(45) Date of Patent: Mar. 7, 2017

(54) STEERING COLUMN RAKE ADJUSTMENT LOCK/UNLOCK DEVICE

(71) Applicant: GM GLOBAL TECHNOLOGY OPERATIONS LLC, Detroit, MI (US)

(72) Inventors: Dan W. Figlioli, Macomb Township, MI (US); Michael P. Phillips, Shelby Township, MI (US); Jessica P. Tran, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/820,037

(22) Filed: Aug. 6, 2015

(65) Prior Publication Data

US 2017/0036689 A1 Feb. 9, 2017

(51) Int. Cl.
    *B62D 1/184* (2006.01)
    *B62D 1/187* (2006.01)

(52) U.S. Cl.
    CPC .......... *B62D 1/184* (2013.01); *B62D 1/187* (2013.01)

(58) Field of Classification Search
    CPC ................................ B62D 1/184; B62D 1/187
    See application file for complete search history.

(56) References Cited

U.S. PATENT DOCUMENTS

| | | | | |
|---|---|---|---|---|
| 4,607,540 A * | 8/1986 | Kinoshita | ............ | B62D 1/184 74/493 |
| 5,022,282 A * | 6/1991 | Nishikawa | ............ | B62D 1/184 280/775 |
| 6,036,228 A * | 3/2000 | Olgren | ................. | B62D 1/184 280/775 |
| 6,543,807 B2 * | 4/2003 | Fujiu | ..................... | B62D 1/184 280/775 |
| 7,469,616 B2 * | 12/2008 | Fujiu | ..................... | B62D 1/184 74/493 |
| 2005/0217407 A1 * | 10/2005 | Yamamura | ............ | B62D 1/184 74/492 |
| 2006/0090587 A1 * | 5/2006 | Kanzler | ................ | B62D 1/181 74/493 |
| 2012/0126521 A1 | 5/2012 | Tinnin et al. | | |
| 2013/0104689 A1 * | 5/2013 | Marutani | ............... | B62D 1/187 74/493 |
| 2014/0305252 A1 * | 10/2014 | Mizuno | ................. | B62D 1/187 74/493 |

(Continued)

FOREIGN PATENT DOCUMENTS

JP        2001130417 A  *  5/2001

*Primary Examiner* — Darlene P Condra
(74) *Attorney, Agent, or Firm* — Quinn Law Group, PLLC

(57) ABSTRACT

A steering column assembly includes a steering column pivotably coupled to a rake bracket at a first pivot point, a rake locking mechanism including a rotatable rake bolt, and a multi-link assembly including a first member, a second member and a third member. The first member includes a first end fixedly coupled to the rotatable rake bolt and the second end rotatably coupled to a first end of the second member. The second member includes a second end rotatably coupled to a first end of a link portion of the third member. The third member includes a link coupled to a lever. A first end of the lever is coupled to a second end of the link. The lever includes a thumb pad. Rotation of the thumb pad around a second pivot point effects rotation of the rotatable rake bolt to lock or unlock the rake locking mechanism.

18 Claims, 4 Drawing Sheets

(56) References Cited

U.S. PATENT DOCUMENTS

2015/0202961 A1 7/2015 Vermeersch et al.
2015/0375769 A1* 12/2015 Abboud ............... B62D 1/181
                                                          74/493

* cited by examiner

STEERING COLUMN RAKE ADJUSTMENT LOCK/UNLOCK DEVICE

TECHNICAL FIELD

The subject matter disclosed herein relates to steering columns for motor vehicles, and a lock mechanism for a rake adjustment thereof.

BACKGROUND

Steering columns for vehicles are often designed with manually adjustable positioning of the steering wheel for improved driver comfort and improved ease of vehicle entry and exit. Such steering columns may be provided with a locking mechanism and an adjustable rake, which allows angular adjustment of the steering wheel in the vertical direction, i.e., up and down. Steering columns may also be provided with a telescopic adjustment that allows the steering wheel to be moved closer to or farther away from the driver. A steering column rake may be manually adjusted by releasing an adjustment lever from a secured position, which allows for rotation of the steering column about a pivot point, which may be located at an end of the steering column opposite that of the steering wheel. Returning the adjustment lever to the secured position retains the steering column at a desired set position about the pivot point. Known rake adjustment levers project into the passenger compartment foot area when in a released position, and may require separating a knee bolster into two separate components to provide a clearance slot that is capable of permitting rotation of the rake adjustment lever to the released position.

SUMMARY

A steering column assembly is described, and includes a steering column pivotably coupled to a rake bracket at a first pivot point, a rake locking mechanism including a rotatable rake bolt configured to selectively lock the steering column to the rake bracket, and a multi-link assembly including a first member, a second member and a third member. The first member is a rigid member having a first end and a second end, including the first end fixedly coupled to the rotatable rake bolt and the second end rotatably coupled to a first end of the second member. The second member is a rigid member having the first end and a second end, including the second end rotatably coupled to a first end of a link portion of the third member. The third member is a rigid member including a link portion coupled to a lever portion, wherein the link portion has a first end and a second end, the lever portion has a first end and a second end, and the lever portion includes a thumb pad at its second end. The first end of the lever portion is joined to the second end of the link portion at a second pivot point, and the third member is rotatably coupled to the steering column at the second pivot point. Rotation of the thumb pad around the second pivot point effects rotation of the rotatable rake bolt to lock or unlock the rake locking mechanism at the second attachment location.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 3-1 through 3-8 each show the steering column and multi-link assembly with the rotatable rake bolt in the locked position or with the rotatable rake bolt in the unlocked position, in accordance with the disclosure.

DETAILED DESCRIPTION

Figure 1:
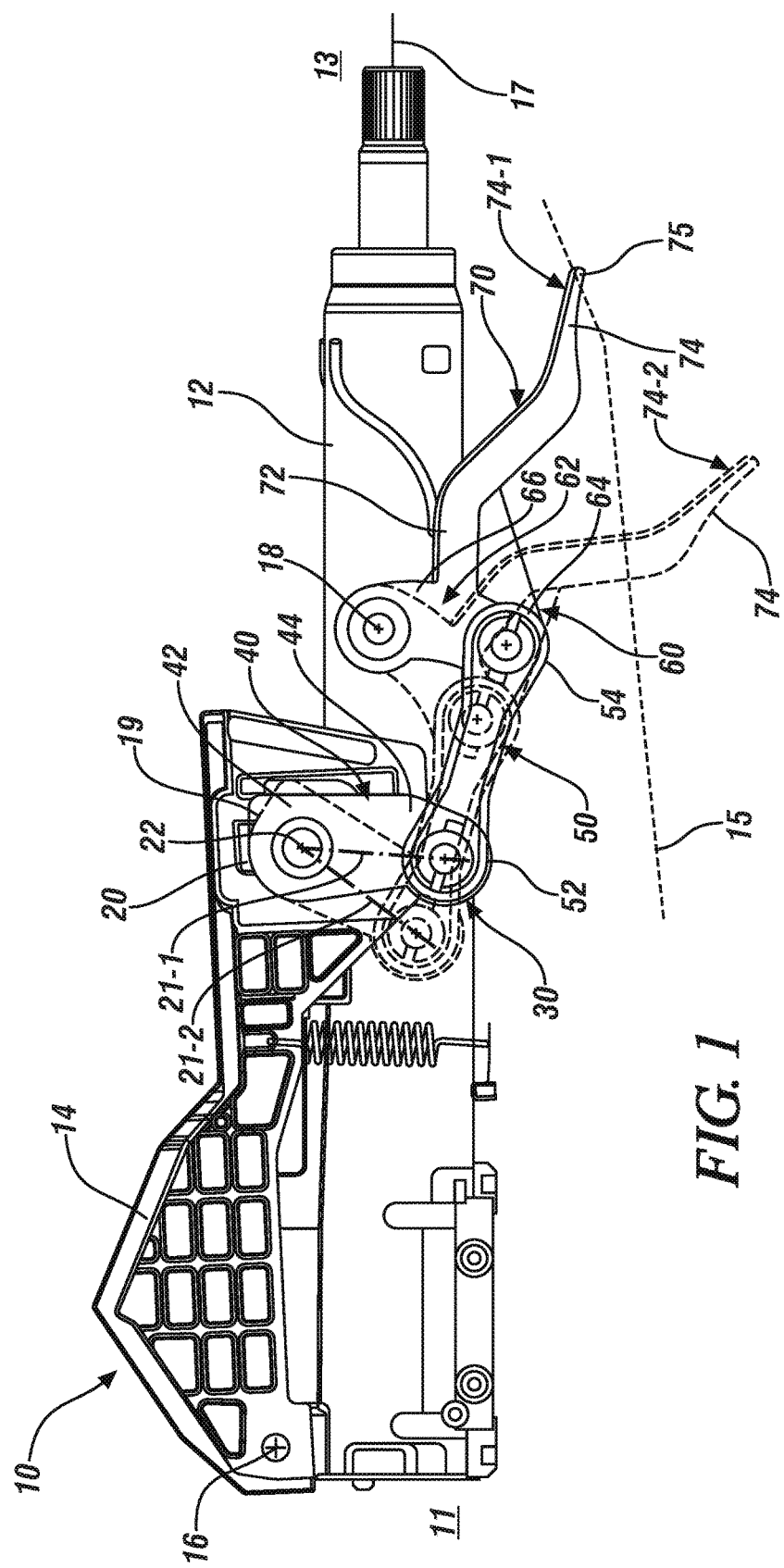
FIG. 1 schematically illustrates a side view of a steering column assembly for a vehicle that includes a rake adjustment system, in accordance with the disclosure.

Referring to the drawings, wherein like numerals indicate like or corresponding parts throughout the several views, FIG. 1 schematically illustrates a side view of a steering column assembly 10 for a vehicle that includes a rake adjustment system in accordance with one embodiment of this disclosure. The steering column assembly 10 is housed in the vehicle passenger compartment beneath a dashboard assembly on the driver's side, and may be covered by a knee bolster or another element, as indicated by line 15. Like numerals and like terms refer to like elements throughout the description. The terms "clockwise" and "counter-clockwise" and other rotational direction references are viewed and described from the same perspective throughout the disclosure.

The steering column assembly 10 includes a steering column 12 that is supported on a rake bracket 14 at a first attachment point 16 and also supported on the rake bracket 14 by a rake locking mechanism 20 at a second attachment location 19. The steering column assembly 10 includes a steering column 12 having a first end 13, to which a steering wheel (not shown), or other operator control, is connectable, and a second end 11, which is operably connected to a steering system (not shown) that translates rotational motion of the column 12 about a column axis 17 into steering motion of the motor vehicle. In one embodiment, the second end 11 corresponds to a forward portion of the vehicle. In one embodiment, the steering column 12 is pivotably coupled to the rake bracket 14 at the first attachment point 16, which serves as a pivot point, and the steering column 12 is releasably secured to the rake bracket 14 at the second attachment location 19 employing the rake locking mechanism 20. The steering column 12 may pivot about the first attachment point 16 to adjust elevation of the second end of the steering column 12, i.e., raise or lower the steering wheel.

In some embodiments, the steering column 12 includes an outer jacket and a telescoping inner jacket, with the outer jacket of the steering column 12 pivotably coupled to the rake bracket 14 at the first attachment point 16, and the inner jacket of the steering column 12 releasably secured to the rake bracket 14 using the rake locking mechanism 20 at the second attachment location 19.

The rake locking mechanism 20 may include a compression bracket that interacts with a rotatable rake bolt 22 to secure or release the steering column 12 from the rake bracket 14. The rotatable rake bolt 22 is configured to selectively lock the steering column 12 to the rake bracket 14, and includes one or more cam members (not shown) or other suitable locking mechanisms adapted to mechanically engage portions of the steering column 12 and the rake bracket 14 to lock the steering column 12 to the rake bracket 14 at the second attachment location 19. Rake locking mechanisms are known to those skilled in the art. The rotatable rake bolt 22 secures the steering column 12 in a locked position at the second attachment location 19 when the rotatable rake bolt 22 is rotated to a first, locked position 21-1, and releases the steering column 12 from the second attachment location 19 when the rotatable rake bolt 22 is rotated to a second, unlocked position 21-2, thereby permitting a change in the rake position of the steering column 12. By way of a non-limiting example, the rotatable rake bolt 22 may have a rotational range of travel of 35° in a clockwise direction between the first, locked position 21-1 and the second, unlocked position 21-2. The angular positions of the first, locked position 21-1 and the second, unlocked position 21-2 are referenced in context of an axis of rotation of the rotatable rake bolt 22.

A multi-link assembly 30 fixedly couples to the rotatable rake bolt 22 to effect its rotation, and is composed of a first member 40, a second member 50 and a third member 60 that includes a link portion 62 and a lever portion 70. The multi-link assembly 30 is depicted with the rotatable rake bolt 22 in both the first, locked position 21-1 and the second, unlocked position 21-2. The lever portion 70 serves as a rake adjustment lever that can be employed by a driver to unlock the rake locking mechanism 20 to adjust the steering column 12 to a desired set point. Each of the first, second and third members 40, 50 and 60 are elongated rigid members fabricated from suitable materials such as polymers. The first member 40 includes a first end 42 and a second end 44, with the first end 42 fixedly coupled to the rotatable rake bolt 22 and the second end 44 rotatably coupled to a first end 52 of the second member 50 due to the fixed relationship. The second member 50 includes the first end 52 and a second end 54, with the second end 54 rotatably coupled to a first end 64 of the link portion 62 of the third member 60. The third member 60 includes the link portion 62 that is coupled to the lever portion 70, with the link portion 62 having the first end 64 and a second end 66, and the lever portion 70 having a first end 72 and a second end 74. The first end 72 of the lever portion 70 is fixedly coupled to the second end 66 of the link portion 62. In one embodiment, the link portion 62 is fixedly coupled to the lever portion 70 such that a longitudinal axis of the link portion 62 is at an acute angle relative to a longitudinal axis of the lever portion 70. Alternatively, the link portion 62 may be fixedly coupled to the lever portion 70 such that a longitudinal axis of the link portion 62 is at a right angle relative to a longitudinal axis of the lever portion 70. Alternatively, the link portion 62 may be fixedly coupled to the lever portion 70 such that a longitudinal axis of the link portion 62 is at an obtuse angle relative to a longitudinal axis of the lever portion 70. The lever portion 70 may include a thumb pad 75 at its second end 74. The second end 66 of the link portion 62 is rotatably coupled to the steering column 12 at a second pivot point 18. It is appreciated that the lever portion 70 having the thumb pad 75 located at its second end 74 of is one embodiment of a rake adjustment lever. Other rake adjustment lever configurations may be employed to rotate the link portion 62 of the third member 60 about the second pivot point 18 to effect locking or unlocking of the rake locking mechanism 20. Linear lengths of the first member 40, second member 50 and the link portion 62 and lever portion 70 of the third member 60 are application-specific, and selected to effect rotation of the rotatable rake bolt 22 to the first, locked position 21-1 when the thumb pad 75 is at a first position 74-1, and also effect rotation of the rotatable rake bolt 22 to the second, unlocked position 21-2 when the thumb pad 75 is at a second position 74-2. The rotatable rake bolt 22 and/or the second pivot point 18 may include elements that generate static friction over portions of their respective ranges of rotational travel. Such static friction may be employed to hold the rotatable rake bolt 22 to the first, locked position 21-1.

When the thumb pad 75 is at the first position 74-1, the rotatable rake bolt 22 is at the first, locked position 21-1, thus locking the rake locking mechanism 20 and securing the steering column 12 to the rake bracket 14. When the thumb pad 75 is at the second position 74-2, the rotatable rake bolt 22 is at the second, unlocked position 21-2, thus unlocking the rake locking mechanism 20 and releasing the steering column 12 from the rake bracket 14, permitting its movement up or down. Movement of the thumb pad 75 in a first, counter-clockwise direction rotates the rotatable rake bolt 22 to the first, locked position 21-1 to lock the rake locking mechanism 20. In a similar manner, movement of the thumb pad 75 in a second, clockwise direction rotates the rotatable rake bolt 22 to the second, unlocked position 21-2 to unlock the rake locking mechanism 20. Such an arrangement decreases packaging space that is needed to articulate, i.e., move the thumb pad 75 to unlock the rake locking mechanism 20 and release the steering column 12 from the rake bracket 14, thus permitting its movement up or down. This may also increase knee bolster surface area in the underdash portion of the passenger compartment by reducing the surface area needed for a slot for articulation of the thumb pad 75.

Figure 2:
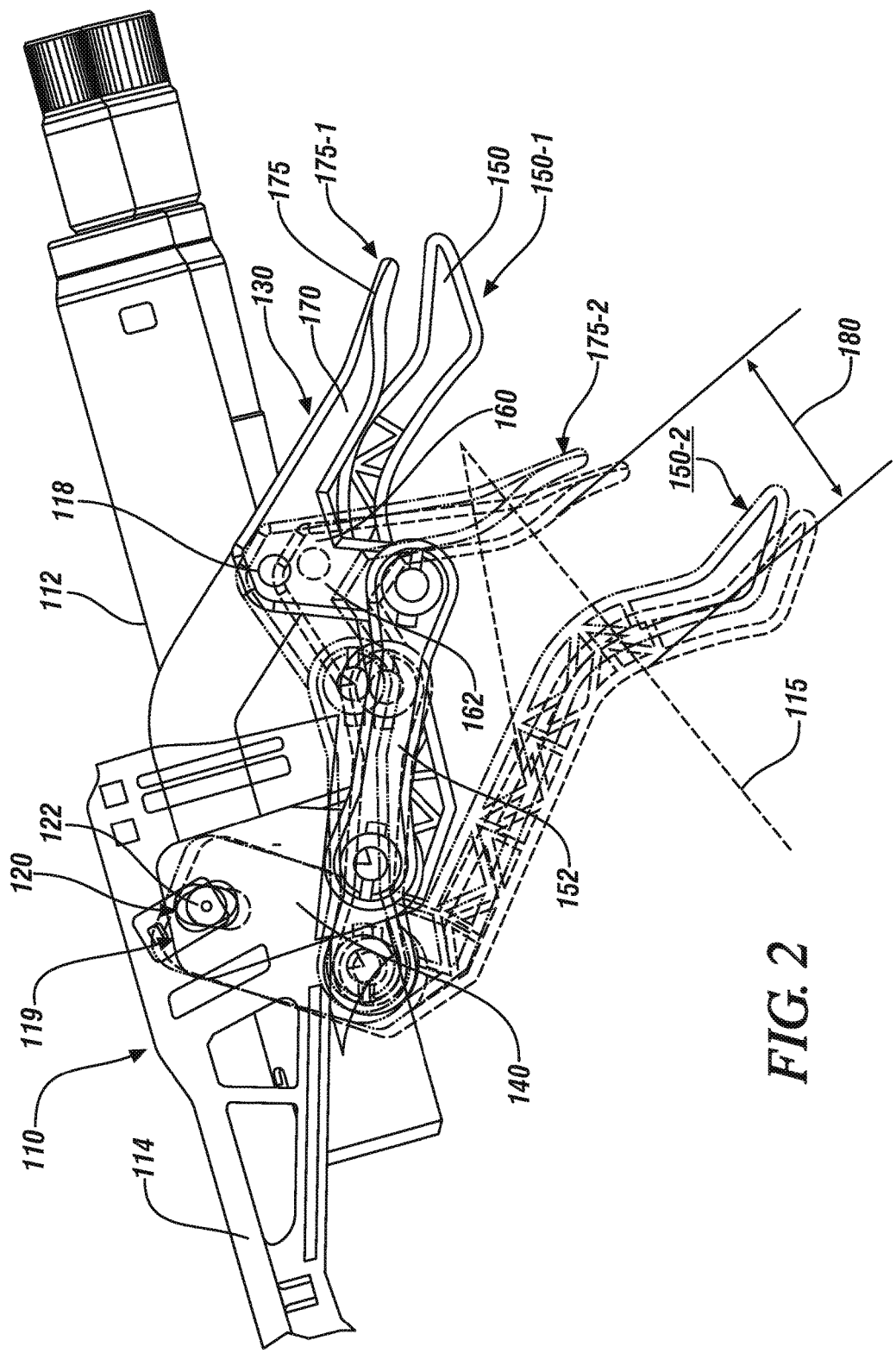
FIG. 2 schematically illustrates a side view of an embodiment of a rake bracket and steering column assembly for a vehicle that includes a rotatable rake bolt coupled to a novel rake locking mechanism in comparison with the rotatable rake bolt coupled to a known rake adjustment lever, in accordance with the disclosure.

FIG. 2 schematically illustrates a side view of an embodiment of a rake bracket 114 and steering column assembly 110 for a vehicle that includes a rake locking mechanism 120 having a rotatable rake bolt 122. The rotatable rake bolt 122 is configured to selectively lock the steering column 112 to the rake bracket 114 at a second attachment location 119. The steering column 112, rake bracket 114, second attachment location 119 and rotatable rake bolt 122 are analogous to those elements described with reference to FIG. 1. An outer periphery of a knee bolster 115 is also shown. The rotatable rake bolt 122 is shown coupled to an embodiment of the multi-link assembly 130. The multi-link assembly 130 fixedly couples to the rotatable rake bolt 122 to effect its rotation, and is composed of a first member 140, a second member 152 and a third member 160 that includes a link portion 162 and a lever portion 170 including a thumb pad 175. The multi-link assembly 130 and rotatable rake bolt 122 operate together to secure or release the steering column 112 and the rake bracket 114 based upon the rotational position of the rotatable rake bolt 122. The third member 160 is rotatably coupled to a second pivot point 118 mounted on the steering column 112, which is located at a junction of the link portion 162 and the lever portion 170. The third member 160 including the thumb pad 175 rotates about the second pivot point 118 to effect locking and unlocking. When the thumb pad 175 is at a first position 175-1, the multi-link assembly 130 holds the rotatable rake bolt 122 at its locked position to secure the steering column 112 to the rake bracket 114. When the thumb pad 175 is at a second position 175-2, the multi-link assembly 130 holds the rotatable rake bolt 122 at its unlocked position to release the steering column 112 from the rake bracket 114, thus permitting rake adjustment of the steering column 112.

By way of comparison, the rotatable rake bolt 122 is shown being coupled to a known rake adjustment lever 150, which operates to secure or release the steering column 112 and the rake bracket 114 based upon the rotational position of the rotatable rake bolt 122. When the known rake adjustment lever 150 is at a first position 150-1, the rake adjustment lever 150 rotates the rotatable rake bolt 122 to its locked position to secure the steering column 112 to the rake bracket 114. When the known rake adjustment lever 150 is at a second position 150-2, the known rake adjustment lever 150 rotates the rotatable rake bolt 122 to its unlocked position to release the steering column 112 to the rake bracket 114. The positions of the known rake adjustment lever 150 at its second position 150-2 and the thumb pad 175 of the multi-link assembly 130 at its second position 175-2 are shown in relation to the outer periphery of the knee bolster 115, including a linear difference 180 therebetween. The linear difference 180 indicates that the projection of the rake adjustment lever 150 at its second position 150-2 through the knee bolster 115 is substantially greater that the projection of the thumb pad 175 at its second position 175-2 through the knee bolster 115, with the linear difference 180 being greater than 56 mm in one embodiment.

Figures 1, 3:
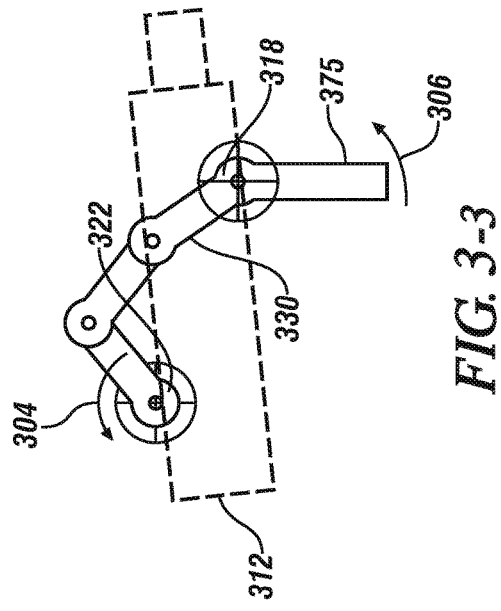
Figures 2, 3:
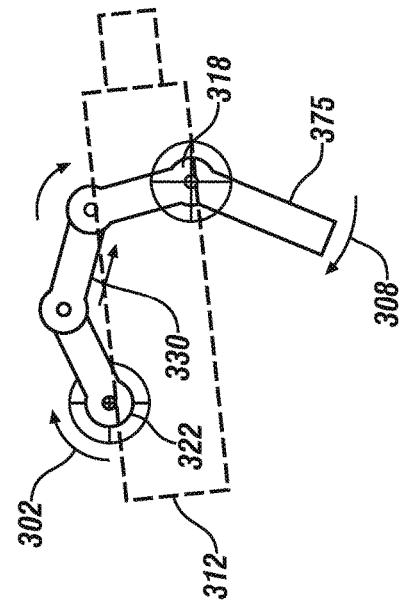
Figure 3:
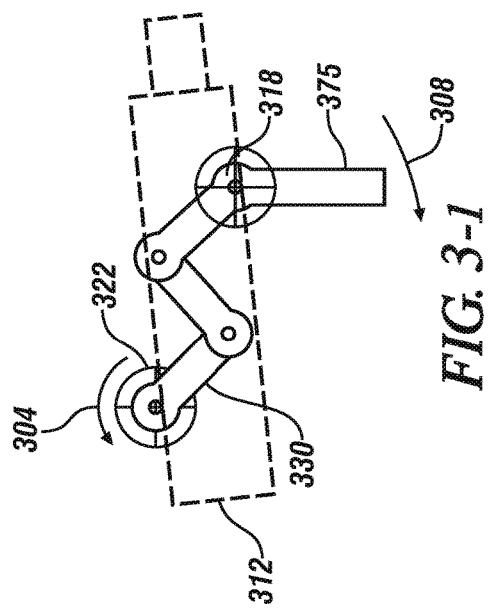

FIGS. 3-1 and 3-2 schematically show an embodiment of the multi-link assembly 330 coupled to a rotatable rake bolt 322. The rotatable rake bolt 322 rotates in a counter-clockwise direction 304 to effect locking of the steering column 312 and rotates in a clockwise direction 302 to effect release of the steering column 312. The multi-link assembly 330 is analogous to the multi-link assembly 30 described with reference to FIG. 1, and includes a thumb pad 375 and a second pivot point 318. FIG. 3-1 shows the multi-link assembly 330 with the rotatable rake bolt 322 in the locked position and FIG. 3-2 shows the multi-link assembly 330 with the rotatable rake bolt 322 in the unlocked position. The unlocked position is achieved by rotating the thumb pad 375 in the counter-clockwise direction 306 about the second pivot point 318, which effects the clockwise rotation 302 of the rotatable rake bolt 322. The locked position is achieved by rotating the thumb pad 375 in the clockwise direction 308 about the second pivot point 318, which effects the counter-clockwise rotation 304 of the rotatable rake bolt 322. Thus, the unlocked position may be achieved by a pulling action on the thumb pad 375 by the driver, and the locked position may be achieved by a pushing action on the thumb pad 375 by the driver.

Figures 3, 4:
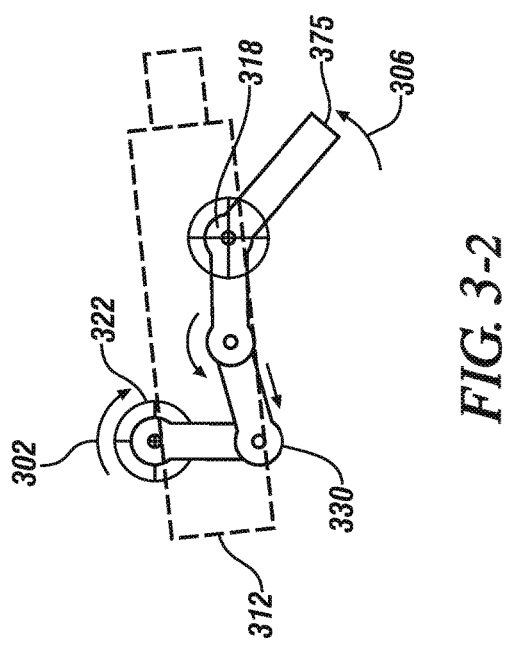

FIGS. 3-3 and 3-4 schematically show an embodiment of the multi-link assembly 330 coupled to a rotatable rake bolt 322. The rotatable rake bolt 322 rotates in a counter-clockwise direction 304 to effect locking of the steering column 312 and rotates in a clockwise direction 302 to effect release of the steering column 312. The multi-link assembly 330 is analogous to the multi-link assembly 30 described with reference to FIG. 1, and includes a thumb pad 375 and a second pivot point 318. FIG. 3-3 shows the multi-link assembly 330 with the rotatable rake bolt 322 in the locked position and FIG. 3-4 shows the multi-link assembly 330 with the rotatable rake bolt 322 in the unlocked position. The unlocked position is achieved by rotating the thumb pad 375 in the clockwise direction 308 about the second pivot point 318, which effects the clockwise rotation 302 of the rotatable rake bolt 322. The locked position is achieved by rotating the thumb pad 375 in the counter-clockwise direction 306 about the second pivot point 318, which effects the counter-clockwise rotation 304 of the rotatable rake bolt 322. Thus, the unlocked position may be achieved by a pushing action on the thumb pad 375 by the driver, and the locked position may be achieved by a pulling action on the thumb pad 375 by the driver.

Figures 3, 4, 5:
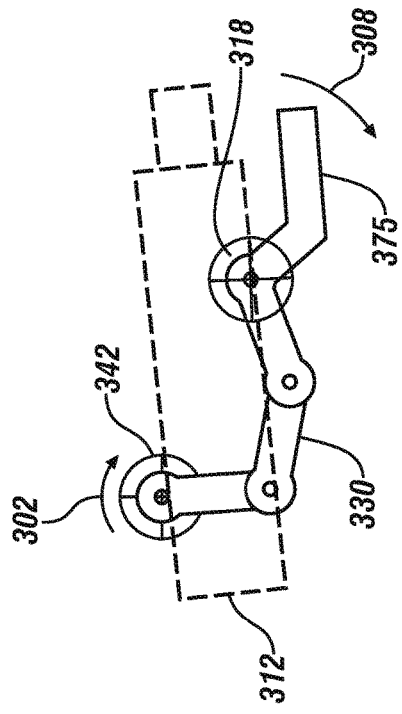
Figures 3, 4, 5, 6:
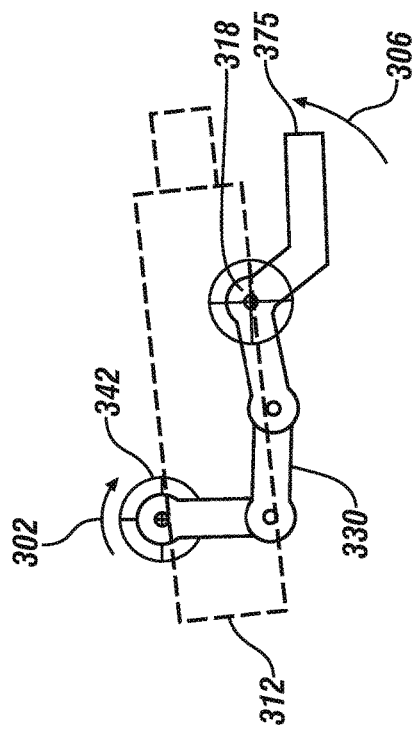
Figures 3, 4, 5, 6, 7:
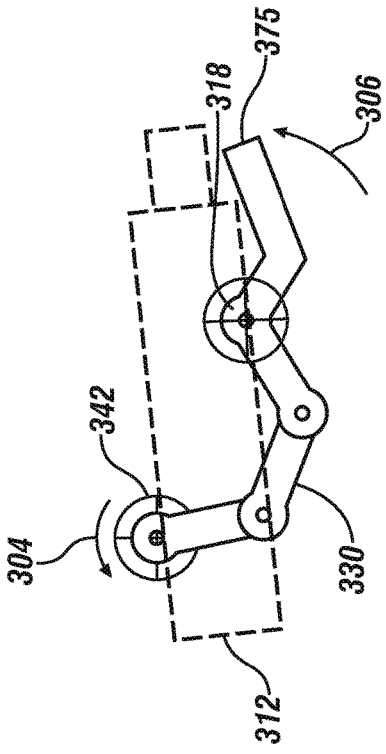
Figures 3, 4, 5, 6, 7, 8:
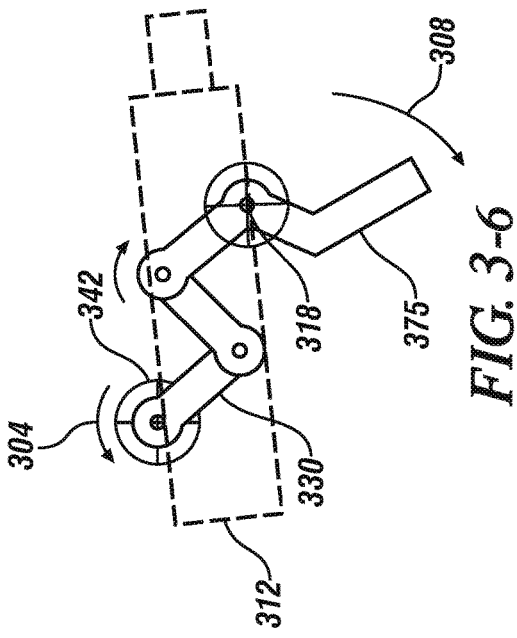

FIGS. 3-5 and 3-6 schematically show an embodiment of the multi-link assembly 330 coupled to another embodiment of the rotatable rake bolt 342. In this embodiment, the rotatable rake bolt 342 rotates in a clockwise direction 302 to effect locking of the steering column 312 and rotates in a counter-clockwise direction 304 to effect release of the steering column 312. The multi-link assembly 330 is analogous to the multi-link assembly 30 described with reference to FIG. 1, and includes a thumb pad 375 and a second pivot point 318. FIG. 3-5 shows the multi-link assembly 330 with the rotatable rake bolt 342 in the locked position and FIG. 3-6 shows the multi-link assembly 330 with the rotatable rake bolt 342 in the unlocked position. The unlocked position is achieved by rotating the thumb pad 375 in the clockwise direction 308 about the second pivot point 318, which effects the counter-clockwise rotation 304 of the rotatable rake bolt 342. The locked position is achieved by rotating the thumb pad 375 in the counter-clockwise direction 306 about the second pivot point 318, which effects the clockwise rotation 302 of the rotatable rake bolt 342. Thus, the unlocked position may be achieved by a pushing action on the thumb pad 375 by the driver, and the locked position may be achieved by a pulling action on the thumb pad 375 by the driver.

FIGS. 3-7 and 3-8 schematically show an embodiment of the multi-link assembly 330 coupled to another embodiment of the rotatable rake bolt 342. In this embodiment, the rotatable rake bolt 342 rotates in a clockwise direction 302 to effect locking of the steering column 312 and rotates in a counter-clockwise direction 304 to effect release of the steering column 312. The multi-link assembly 330 is analogous to the multi-link assembly 30 described with reference to FIG. 1, and includes a thumb pad 375 and a second pivot point 318. FIG. 3-7 shows the multi-link assembly 330 with the rotatable rake bolt 342 in the locked position and FIG. 3-8 shows the multi-link assembly 330 with the rotatable rake bolt 342 in the unlocked position. The unlocked position is achieved by rotating the thumb pad 375 in the counter-clockwise direction 306 about the second pivot point 318, which effects the counter-clockwise rotation 304 of the rotatable rake bolt 342. The locked position is achieved by rotating the thumb pad 375 in the clockwise direction 308 about the second pivot point 318, which effects the clockwise rotation 302 of the rotatable rake bolt 342. Thus, the unlocked position may be achieved by a pulling action on the thumb pad 375 by the driver, and the locked position may be achieved by a pushing action on the thumb pad 375 by the driver.

The configurations shown with reference to FIGS. 3-1 and 3-2 and shown with reference to FIGS. 3-7 and 3-8 depict the multi-link assembly 330 coupled to an embodiment of the rotatable rake bolt 342, wherein the thumb pad 375 rotates in a forward direction such that the unlocked position may be achieved by a pulling action on the thumb pad 375 by the driver, and the locked position may be achieved by a pushing action on the thumb pad 375 by the driver.

Furthermore, the concepts described herein require less packaging space to articulate a lock-to-unlock travel function of the lever and thumb pad in comparison with known systems. This permits an increase of knee bolster surface area by reducing the packaging space needed to clear the rake adjustment lever in the form of the thumb pad 375 when it is rotated to the unlocked position.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A steering column assembly, comprising:
   a steering column pivotably coupled to a rake bracket at a first pivot point;
   a rake locking mechanism including a rotatable rake bolt configured to selectively lock the steering column to the rake bracket at a second attachment location; and
   a multi-link assembly including a first member, a second member and a third member, including:
      the first member being a rigid member having a first end and a second end, including the first end fixedly coupled to the rotatable rake bolt and the second end rotatably coupled to a first end of the second member,
      the second member being a rigid member having the first end and a second end, including the second end rotatably coupled to a first end of a link portion of the third member,
      the third member being a rigid member including a link portion coupled to a lever portion,
      the link portion having a first end and a second end and the lever portion having a first end and a second end, the lever portion including a thumb pad at its second end,
      the first end of the lever portion joined to the second end of the link portion at a second pivot point, and
      the third member rotatably coupled to the steering column at the second pivot point;
   wherein rotation of the thumb pad around the second pivot point effects rotation of the rotatable rake bolt to lock or unlock the rake locking mechanism at the second attachment location.

2. The steering column assembly of claim 1, wherein rotation of the thumb pad around the second pivot point comprises a clockwise rotation of the thumb pad to effect a counter-clockwise rotation of the rotatable rake bolt to lock the rake locking mechanism.

3. The steering column assembly of claim 1, wherein rotation of the thumb pad around the second pivot point comprises a counter-clockwise rotation of the thumb pad to effect a clockwise rotation of the rotatable rake bolt to unlock the rake locking mechanism.

4. The steering column assembly of claim 1, wherein rotation of the thumb pad around the second pivot point comprises a counter-clockwise rotation of the thumb pad to effect a counter-clockwise rotation of the rotatable rake bolt to lock the rake locking mechanism.

5. The steering column assembly of claim 1, wherein rotation of the thumb pad around the second pivot point comprises a clockwise rotation of the thumb pad to effect a clockwise rotation of the rotatable rake bolt to unlock the rake locking mechanism.

6. The steering column assembly of claim 1, wherein rotation of the thumb pad around the second pivot point comprises a counter-clockwise rotation of the thumb pad to effect a clockwise rotation of the rotatable rake bolt to lock the rake locking mechanism.

7. The steering column assembly of claim 1, wherein rotation of the thumb pad around the second pivot point comprises a clockwise rotation of the thumb pad to effect a counter-clockwise rotation of the rotatable rake bolt to unlock the rake locking mechanism.

8. The steering column assembly of claim 1, wherein rotation of the thumb pad around the second pivot point comprises a clockwise rotation of the thumb pad to effect a clockwise rotation of the rotatable rake bolt to lock the rake locking mechanism.

9. The steering column assembly of claim 1, wherein rotation of the thumb pad around the second pivot point comprises a counter-clockwise rotation of the thumb pad to effect a clockwise rotation of the rotatable rake bolt to unlock the rake locking mechanism.

10. The steering column assembly of claim 1, wherein the rotation of the thumb pad around the second pivot point effects rotation of the rotatable rake bolt to unlock the rake locking mechanism to permit rotation of the steering column relative to the rake bracket at the first pivot point.

11. The steering column assembly of claim 1, wherein the rotation of the thumb pad around the second pivot point effects rotation of the rotatable rake bolt to lock the rake locking mechanism to prevent rotation of the steering column relative to the rake bracket at the first pivot point.

12. The steering column assembly of claim 1, wherein the link portion of the third member couples to the lever portion of the third member at an acute angle.

13. The steering column assembly of claim 1, wherein the link portion of the third member couples to the lever portion of the third member at a right angle.

14. The steering column assembly of claim 1, wherein the link portion of the third member couples to the lever portion of the third member at an obtuse angle.

15. The steering column assembly of claim 1, wherein the rotation of the thumb pad around the second pivot point to effect rotation of the rotatable rake bolt to lock the rake locking mechanism comprises rotation of the thumb pad in response to a forward pushing action to lock the rake locking mechanism.

16. The steering column assembly of claim 1, wherein the rotation of the thumb pad around the second pivot point to effect rotation of the rotatable rake bolt to lock the rake locking mechanism comprises rotation of the thumb pad in response to a pulling action to lock the rake locking mechanism.

17. A multi-link assembly coupled to a rotatable rake bolt of a rake locking mechanism configured to selectively lock a steering column to a rake bracket at an attachment location, the multi-link assembly comprising:
   a first member, a second member and a third member;
   wherein the first member is a rigid member having a first end and a second end, including the first end being coupled to the rotatable rake bolt and the second end being rotatably coupled to a first end of the second member;
   wherein the second member is a rigid member having the first end and a second end, including the second end rotatably coupled to a first end of a link portion of the third member;
   wherein the third member is a rigid member including a second link portion coupled to a lever portion, the second link portion having a first end and a second end and the lever portion having a first end and a second end, wherein the first end of the lever portion is coupled to the second end of the second link portion at a pivot point, and the pivot point being rotatably coupled to the steering column;

wherein rotation of the lever portion around the pivot point effects rotation of the rotatable rake bolt to lock or unlock the rake locking mechanism at the second attachment location.

18. A steering column assembly for a vehicle, comprising:
a steering column pivotably coupled to a rake bracket at a first pivot point;
a rake locking mechanism including a rotatable rake bolt configured to selectively lock the steering column to the rake bracket at an attachment location; and
a multi-link assembly including a first member, a second member and a third member, including:
  the first member being an elongated member having a first end and a second end, including the first end fixedly coupled to the rotatable rake bolt and the second end rotatably coupled to a first end of the second member,
  the second member being an elongated member having the first end and a second end, including the second end rotatably coupled to a first end of a link portion of the third member,
  the third member being an elongated member including a link portion coupled to a rake adjustment lever,
  the link portion having a first end and a second end, and the rake adjustment lever having a first end and a second end, wherein the first end of the rake adjustment lever is coupled to the second end of the link portion, and
  the second end of the link portion being rotatably coupled to the steering column at a second pivot point;
wherein movement of the rake adjustment lever towards a forward portion of the vehicle rotates the rake bolt to a first position to lock the rake locking mechanism to lock the steering column to the rake bracket at the attachment location; and
wherein movement of the rake adjustment lever away from the forward portion of the vehicle rotates the rake bolt to a second position to unlock the rake locking mechanism to unlock the steering column from the rake bracket at the attachment location.

* * * * *